(12) United States Patent
Chen et al.

(10) Patent No.: US 8,950,359 B2
(45) Date of Patent: Feb. 10, 2015

(54) SUSPENDED RECEPTACLE HAVING A REMOVABLE LID

(75) Inventors: David Chen, Lewis Center, OH (US); Leighton Chen, Lewis Center, OH (US)

(73) Assignee: Amerihua International Enterprises Inc., Lewis Center, OH (US)

(*) Notice: Subject to any disclaimer, the term of this patent is extended or adjusted under 35 U.S.C. 154(b) by 491 days.

(21) Appl. No.: 13/444,952

(22) Filed: Apr. 12, 2012

(65) Prior Publication Data

US 2013/0098297 A1 Apr. 25, 2013

Related U.S. Application Data

(60) Provisional application No. 61/474,526, filed on Apr. 12, 2011.

(51) Int. Cl.
*A01K 39/00* (2006.01)
*E06B 5/00* (2006.01)
*A01K 39/01* (2006.01)
*A01K 39/012* (2006.01)

(52) U.S. Cl.
CPC . *E06B 5/00* (2013.01); *A01K 39/01* (2013.01); *A01K 39/012* (2013.01)
USPC ..................................... 119/51.01

(58) Field of Classification Search
USPC ............................. 119/51.01, 52.1, 57.8, 57.9
See application file for complete search history.

(56) References Cited

U.S. PATENT DOCUMENTS

| | | |
|---|---|---|
| 2,570,733 A | 10/1951 | Thomas |
| D194,846 S | 3/1963 | Parry |
| 3,089,605 A | 5/1963 | Buonauro |
| 3,244,150 A | 4/1966 | Benton |
| 3,372,676 A | 3/1968 | Williams |
| 3,526,335 A | 9/1970 | Swett el al. |
| 3,620,637 A * | 11/1971 | Brown .......................... 408/202 |
| D241,860 S | 10/1976 | Calamia |
| 4,691,665 A | 9/1987 | Hefner |
| 4,901,673 A | 2/1990 | Overstreet |
| 4,938,168 A | 7/1990 | Meidell |
| 4,955,319 A | 9/1990 | Brucker |
| 4,980,990 A | 1/1991 | Hiday |
| 5,195,463 A | 3/1993 | Lorenzana |
| 5,247,904 A | 9/1993 | Anderson |
| D417,528 S | 12/1999 | Rizzo |
| 6,067,934 A | 5/2000 | Harwich |
| D454,669 S | 3/2002 | Lieb |
| D472,351 S | 3/2003 | Griffin |
| D509,325 S | 9/2005 | Jung et al. |
| 7,093,562 B2 | 8/2006 | Smothers |
| D530,457 S | 10/2006 | Jung et al. |
| D542,479 S | 5/2007 | O'Dell |
| 7,234,418 B2 | 6/2007 | Fort, II et al. |
| 7,287,486 B2 * | 10/2007 | Hunter .......................... 119/57.8 |
| 7,370,607 B2 * | 5/2008 | O'Dell .......................... 119/52.3 |
| D603,567 S | 11/2009 | Chen et al. |
| 7,874,264 B2 | 1/2011 | McMullen |
| 7,946,249 B2 | 5/2011 | Colvin et al. |
| 7,997,434 B2 | 8/2011 | Benetti |
| D656,279 S | 3/2012 | Tu |
| D656,690 S | 3/2012 | Tu |

(Continued)

*Primary Examiner* — Kymberly Berona
(74) *Attorney, Agent, or Firm* — Standley Law Group LLP

(57) ABSTRACT

A receptacle suspended from a support member having a hollow housing and a lid to enclose the interior thereof. A cable secured to the housing extending though a locking mechanism affixed atop the lid so that the lid may be moved from a closed to an open position.

13 Claims, 5 Drawing Sheets

(56) References Cited

U.S. PATENT DOCUMENTS

| | | |
|---|---|---|
| 8,191,508 B2 * | 6/2012 | Greenwood et al. .......... 119/52.2 |
| 8,245,666 B2 * | 8/2012 | Sena et al. .................... 119/57.8 |
| 8,291,862 B2 | 10/2012 | Gauker et al. |
| D676,614 S | 2/2013 | Fields et al. |
| 8,522,717 B2 | 9/2013 | Carter et al. |
| D707,401 S | 6/2014 | Chen et al. |
| 8,739,733 B2 | 6/2014 | Gauker et al. |
| 8,763,556 B1 | 7/2014 | Vaughn, Jr. |
| 8,763,558 B2 | 7/2014 | Gauker et al. |
| 2005/0000459 A1 | 1/2005 | Buhl et al. |
| 2006/0037546 A1 | 2/2006 | Jung et al. |
| 2009/0145875 A1 | 6/2009 | Gardner |
| 2010/0258054 A1 * | 10/2010 | Frazier ......................... 119/52.2 |
| 2011/0094449 A1 | 4/2011 | George |
| 2011/0168101 A1 | 7/2011 | Guay et al. |
| 2011/0239949 A1 | 10/2011 | Abbott |
| 2012/0060762 A1 | 3/2012 | Cowger et al. |
| 2014/0109835 A1 | 4/2014 | Colvin et al. |
| 2014/0137804 A1 | 5/2014 | Chen et al. |
| 2014/0158056 A1 | 6/2014 | Vaughn, Jr. et al. |

* cited by examiner

SUSPENDED RECEPTACLE HAVING A REMOVABLE LID

CROSS-REFERENCE TO RELATED APPLICATIONS

This application claims priority to U.S. Application No. 61/474,526, filed Apr. 12, 2011, which is incorporated by reference as if fully rewritten herein.

TECHNICAL FIELD

The present invention relates to a device and method for easily moving a lid from a closed position to an open position and returning to a closed position. More particularly, the present invention relates to a device and method for easily moving the lid of a receptacle suspended from a support member from a closed position to an open position without the need to remove the receptacle from its support member.

BACKGROUND

Humans have often taken on a custodial role in the care and maintenance of a variety of living things. In fulfilling this role, humans have provided feeding stations and housings for a variety of living things. Included among these are birds, wherein humans often provide feeders, housing and baths. In some cases the feeders and housing facilities are suspended from a support member such as a tree branch or other feature.

Typical birdfeeders are in the form of a receptacle having food storage for either dry or liquid nourishment. An access opening is usually provided to allow for the filling of the receptacle. A lid is usually associated with the receptacle to guard against the elements and unwanted access to the food within the receptacle. One disadvantage, in many prior art structures, is that the receptacle must be taken down from its support member in order to add additional feed into the receptacle. Furthermore, depending on the size of the receptacle the lid may be unwieldy. Thus, a structure allowing for easy access to the interior of the receptacle for filling is desired. Specifically, a structure allowing moving the lid easily between an open and closed position while the receptacle remains suspended in desired.

Accordingly, exemplary embodiments of the present invention introduce both a method and device for easily moving a receptacle lid from a closed to open position without the need to remove the receptacle from its support member.

SUMMARY OF THE INVENTIVE CONCEPT

Exemplary embodiments of the present invention are directed to suspended receptacles having a removable lid and a locking mechanism attached thereto. Exemplary embodiments of such receptacles allow for access to the interior of the receptacle while remaining in a suspended state.

Exemplary embodiments of the present invention include a receptacle having a housing and a lid. The housing may have a hollow interior and an access opening allowing access to the interior of the housing. The lid is adapted to have an opened and closed position so that while in closed position access to the interior of the housing is denied and while in the open position the interior of the housing is accessible. The lid also has an aperture therein allowing a cable to pass through it and attach to the housing. The other end of the cable is attached to a support member to suspend the receptacle. Although the term cable is used herein, one skilled in the art should understand that a variety of different strand materials, either rigid or flexible, may be used, including but not limited, woven metals, string, and other similar materials.

In exemplary embodiments of the inventive concept, a locking mechanism is attached to the lid. In some exemplary embodiments the locking mechanism may be shaped like a finial. The locking mechanism may have several parts including a cap and a body member. The cap may have an interior cavity having a threaded lower portion and a domed upper portion. The body member may have a flanged portion and a pair of threaded shafts extending axially therefrom. A friction grip is molded onto the end of at least one of the shafts. The friction grip includes partitioned tabs each having a resting state and each is capable of being deformed inwardly. Both the cap and the body member have passageways therein allowing passage of the cable.

Additionally, the locking mechanism has a locked and a released position. While in the locked position the locking mechanism does not move relative to the cable and while in the released position the locking mechanism is free to move relative to the cable. As the locking mechanism is attached to the lid, one skilled in the art should understand that the lid may also move relative to the cable when the locking mechanism is in the released position and be prevented from moving relative to the cable when the locking mechanism is in the locked position.

To place the locking mechanism in the locked position the cap is threaded onto the threaded shaft of the body member having the friction grip. As the cap is screwed further onto the threaded shaft the friction grip extends further into the domed upper portion of the cap. Eventually, the partitioned tabs contact the inner surface of the upper portion and begin to deform inwardly as the cap is screwed further onto the threaded shaft. This inward deformation of the partitioned tabs begins to apply a gripping force to the cable in the passageway. When the cap is placed in the locked position the gripping force is so great that the locking mechanism is prevented from moving relative to the cable. To allow movement of the locking mechanism along the cable the cap is reversed from the threaded shaft until the partitioned tabs return to their resting state releasing the gripping force on the cable.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

The purposes, characteristics and advantages of the invention as described above will be better understood from the detailed description of embodiments that are illustrated in the appended drawings, wherein.

DETAILED DESCRIPTION OF EXEMPLARY EMBODIMENT(S)

The exemplary embodiments illustrated and described herein relate to birdfeeders. However, is should be understood that the inventive concepts described herein are applicable to any type of receptacle that is adapted to be suspended from a support member wherein access to the interior of the receptacle is desired without the need to remove the receptacle from the support member. Receptacles that may benefit from exemplary embodiments of the inventive concept may include, but are not limited to, birdfeeders (both dry and liquid), birdhouses, insect feeders, squirrel feeders, birdbaths and other similar receptacles. While the description presented herein is directed to a birdfeeder, it should be understood that the inventive concepts are not limited to birdfeeders.

Figure 1:
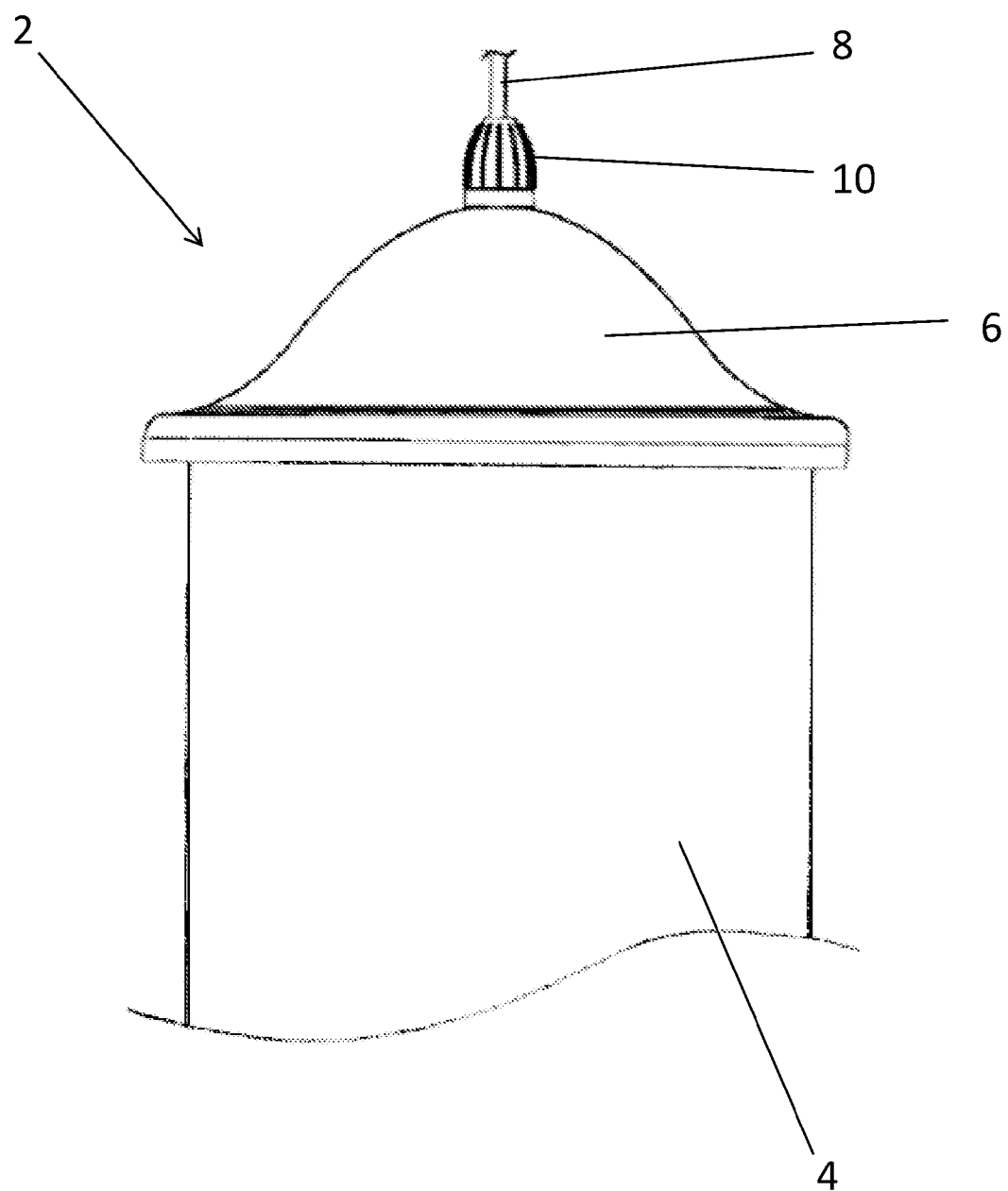
FIG. 1 is a perspective view of a receptacle having an exemplary locking mechanism and removable lid.

FIG. 1 illustrates a birdfeeder 2 having a housing 4 and a lid 6. The housing 4 may include a plurality of dispensing openings providing limited access to the feed within the housing 4 and associated perches upon which birds may rest while accessing the feed in the housing 4. A cable 8 is provided to suspend the birdfeeder 2 from a support member (not shown in the Figures). The cable 8 is secured to the housing at a first end and secured to a support member at a second end. The cable 8 extends through a locking mechanism 10 disposed on the top portion of the lid 6. In some exemplary embodiments, the locking mechanism 10 resembles a finial. Although not shown in the Figures, the support member may be any structure stable enough to support the weight of the birdfeeder, such as, a tree branch, a building beam, or post.

Figure 2:
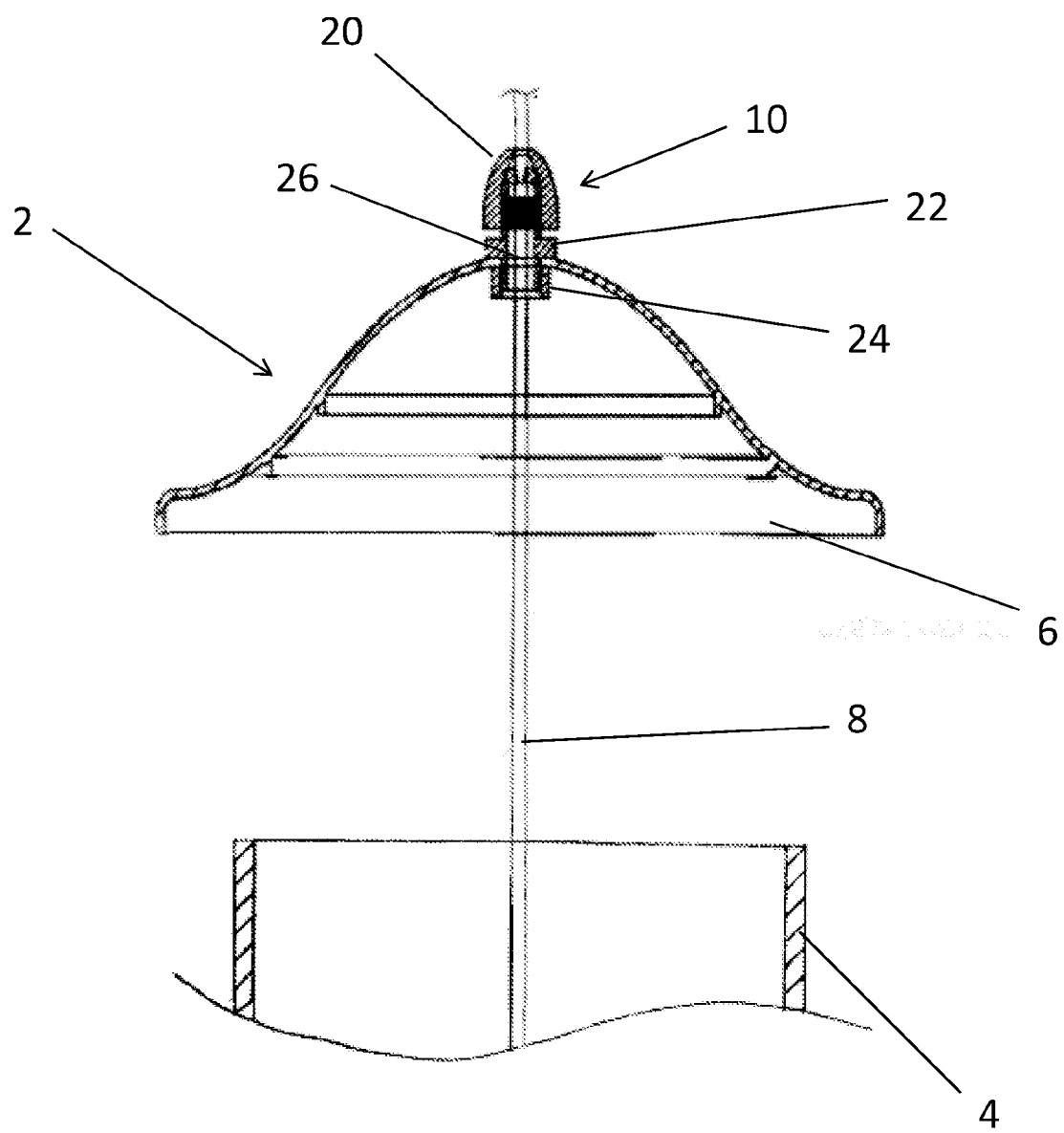
FIG. 2 is a cross-sectional view of a removable lid and an exemplary locking mechanism of the present invention.

As seen in the cross-sectional view of the birdfeeder 2 as illustrated in FIG. 2, the locking mechanism 10 may include a cap 20, a body member 22, and an optional threaded nut 24. As shown in FIG. 2, the lid 6 has an opening 26 therein to receive a portion of the body member 22 of the locking mechanism 10. The portion of the body member 22 extending through the opening 26 in the lid 6 and is secured to the lid 6 by the threaded nut 24. In other exemplary embodiments the opening 26 may be threaded so as to allow the locking mechanism 10 to be secured directly to the lid 6 without the need for the optional threaded nut 24.

As illustrated in FIGS. 1 and 2, the lid 6 is adapted to be moved between a closed position, shown in FIG. 1, and an open position, shown in FIG. 2. When in the open position the lid 6 permits access to the interior of the housing 4. When in the closed position, the lid 6 is in contact with the housing 4 so as to deny access to the interior of the housing 4. The opening and closing of the lid 6 is accomplished through the use of the locking mechanism 10 and will be further described below.

Figure 3:
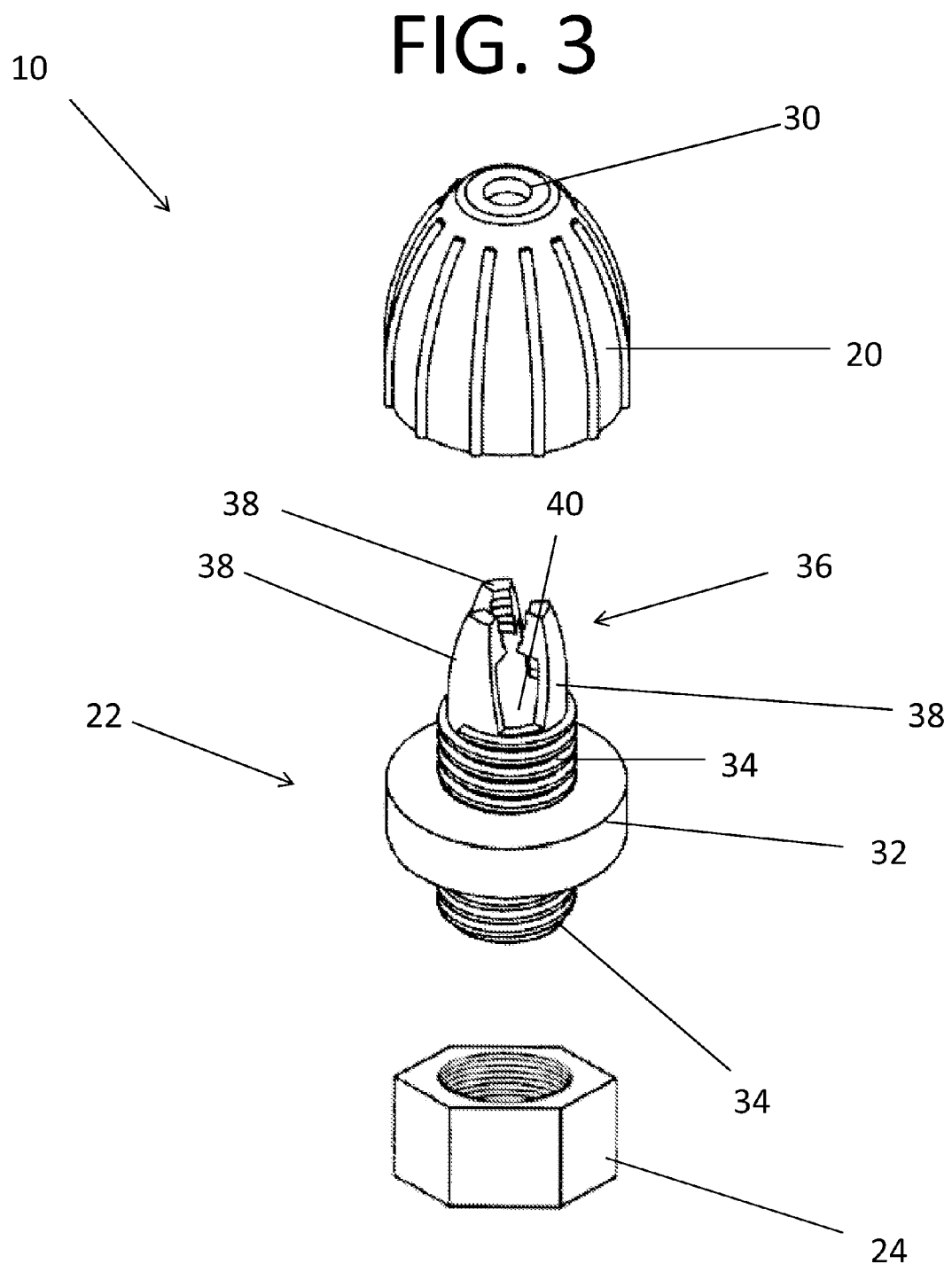
FIG. 3 is an exploded perspective view of an exemplary locking mechanism of the present invention and optional retention nut.
Figure 4:
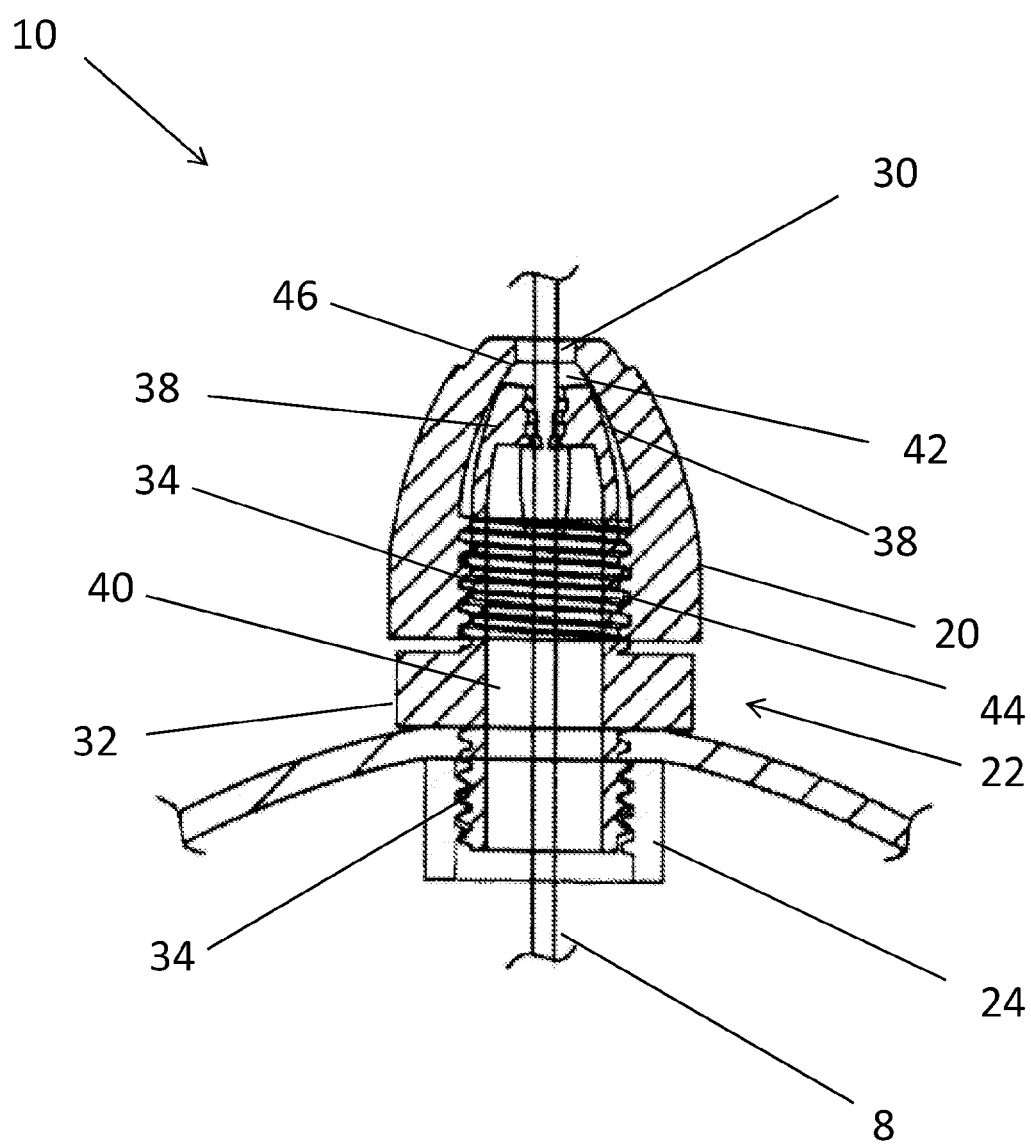
FIG. 4 is a cross-sectional view of an exemplary locking mechanism in the locked position.
Figure 5:
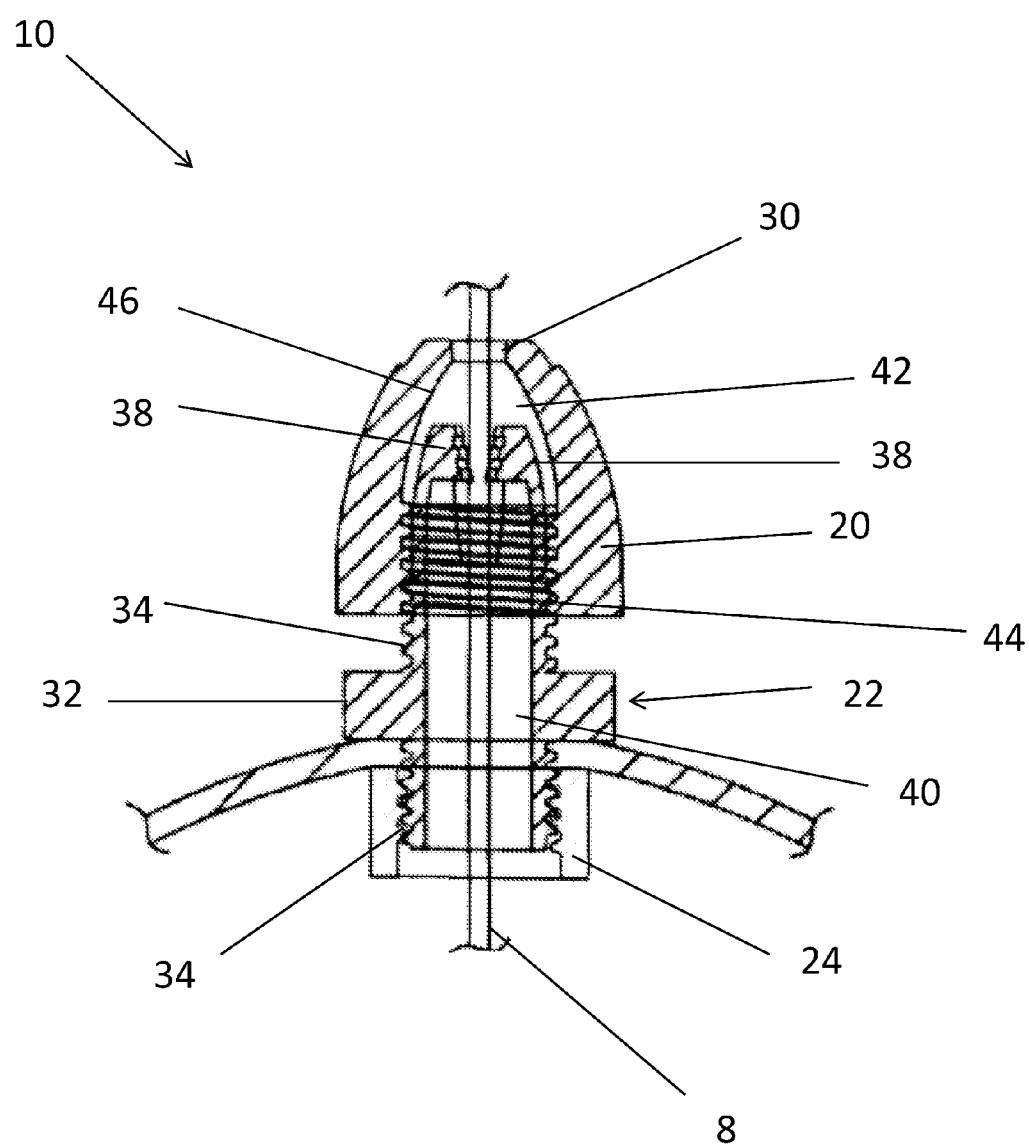
FIG. 5 is a cross-sectional view of an exemplary locking mechanism in the released position.

The locking mechanism 10 disposed on the lid 6 is best illustrated in FIGS. 3, 4, and 5. As shown in these Figures, the locking mechanism 10 includes a cap 20 having a hollow interior cavity 42. The cavity 42 may have a threaded lower portion 44 and a domed upper portion 46. The cap 20 also has an aperture 30 therein through which the cable 8 may pass. The exemplary body member 22 of the locking mechanism 10 resembles a nipple fitting having a flanged body portion 32 and threaded shafts 34 extending axially from the body portion 32. At least one shaft 34 has a friction grip 36 disposed on an end thereof. As illustrated in FIG. 3, the friction grip 36 includes a plurality of partitioned tabs 38. The body member 22 of the locking mechanism also includes a passageway 40 therein so as to allow the cable 8 to pass through.

The cap 20 and body member 22 may be brought together in threaded complimentary engagement to releasably grip the cable 8. Thus, the locking mechanism 10 may have a locked position, as shown in FIG. 4, wherein the partitioned tabs 38 grip the cable 8 preventing locking mechanism 10 from traversing the cable 8. Likewise, the locking mechanism 10 may have a released position, as shown in FIG. 5, wherein the locking mechanism 10 may freely traverse the cable 8.

In the locked position as shown in FIG. 4, the cap 20 is threaded onto the body member 22 so that the partitioned tabs 38 of the friction grip 36 extend into the domed portion 46 of the cavity 42. As the partitioned tabs 38 extend into the domed portion 46 of the cavity 42, the narrowing walls of the domed portion 46 inwardly deform the partitioned tabs 38. The inward deformation results in the partitioned tabs 38 gripping the cable 8 by decreasing the dimension of the passageway 40 through which the cable 8 traverses. To increase the gripping force applied to the cable 8, the cap 20 may be threaded further onto the body member 22 into a locked position. Once sufficient gripping force is reached the locking mechanism 10 and the cable 8 no longer move relative to one another.

To ease the gripping force applied to the cable 8, the cap 20 may be returned to the released position as shown in FIG. 5. In the released position, partitioned tabs 38 are no longer in contact with the domed portion 46 of the cavity 42, thus increasing the dimension of the passageway 40 defined by the partitioned tabs 38. The increase in the dimension of the passageway 40 allows the cable 8 and locking mechanism 10 to move relative to one another.

As shown in the Figures, since the locking mechanism 10 is secured to the lid 6, one skilled in the art would appreciate that the lid 6 may be moved from the closed position to the open position by moving the cap 20 to the released position and sliding the lid 6 along the cable 8. After the lid 6 is moved to the opened position, the cap 20 may be returned to the locked position and the lid 6 retained in the open position along the cable 8. After accessing the interior of the housing 4, the cap 20 may be placed in the released position and the lid 6 returned to the closed position, where the cap 20 may be also be returned to the locked position to retain the cap 20 in contact with the housing 4.

While certain embodiments of the present invention are described in detail above, the scope of the invention is not to be considered limited by such disclosure, and modifications are possible without departing from the spirit of the invention as evidenced by the following claims:

What is claimed is:

1. A suspended receptacle for the feeding of birds, comprising:
    a housing having a hollow interior and an opening therein;
    a lid, said lid adapted to be moved from a closed position to an open position, wherein when said lid is in a closed position said lid and said housing are in contact;
    a locking mechanism disposed on top of said lid, said locking mechanism including a cap and a body member each having a passageway disposed therein; wherein said body member includes a flanged portion and threaded shafts extending axially therefrom; and
    a cable passing through said passageways and secured to said housing.

2. The receptacle of claim 1, wherein said cap defining an internal cavity having a lower threaded portion and an upper domed portion.

3. The receptacle of claim 1, wherein at least one threaded shaft has a friction grip disposed on an end thereof.

4. The receptacle of claim 3, wherein said friction grip comprises a plurality of partitioned tabs, said partitioned tabs adapted to be deformed inwardly to apply a gripping force on said cable.

5. The receptacle of claim 1, further comprising a threaded nut in association with at least one threaded shaft so as to secure said locking mechanism to said lid.

6. The receptacle of claim 1, wherein said locking mechanism has a locked position and a released position, wherein when said locking mechanism is in a released position said locking mechanism and said cable move relative to one another and when said locking mechanism is in a locked position said locking mechanism and said cable do not move relative to one another.

7. A suspended receptacle for the feeding of living creatures, comprising:
- a housing having a hollow interior and an opening therein;
- a lid, said lid adapted to be moved from a closed position to an open position, wherein when said lid is in a closed position said lid and said housing are in contact;
- a locking mechanism disposed atop said lid having a passageway therein, said locking mechanism including:
  - a cap having an internal cavity, said internal cavity including a lower threaded portion and an upper domed portion;
  - a body member, said body member including a flanged middle portion and a pair of shafts extending axially from said middle portion;
  - a friction grip disposed on the end of at least of one of said shafts, said friction grip having a plurality of partitioned tabs;
  - wherein said cap and said shaft having the friction grip disposed thereon are in complimentary threaded engagement so that said partitioned tabs extend into said upper domed portion of said cap; and
- a cable passing through said passageway and secured to said housing.

8. The suspended receptacle of claim 7, wherein said cap has a locked position and a released position, wherein when said cap is in the released position said locking mechanism and said cable are movable relative to one another, and wherein when said locking mechanism is in the locked position said locking mechanism and said cable are not movable relative to one another.

9. The suspended receptacle of claim 8, wherein when said cap is in the locked position the partitioned tabs extend into and contact the domed upper portion of said cap deforming inwardly decreasing the dimension of the passageway therein and applying a gripping force to said cable.

10. The suspended receptacle of claim 7, further comprising a threaded nut in association with at least one threaded shaft so as to secure said locking mechanism to said lid.

11. The suspended receptacle of claim 7, wherein said suspended receptacle is a birdfeeder.

12. A method of opening and closing a receptacle for feeding living creatures, comprising:
- providing a housing having a hollow interior and an opening therein;
- suspending said housing from a support member using a cable, said cable secured to said housing at a first end and to said support member at a second end;
- providing a locking mechanism disposed on said lid, said locking mechanism having a passageway therein, said locking mechanism also having a cap and a body member; said cap including an internal cavity having a lower threaded portion and an upper domed portion, said body member having a flanged portion and a pair of threaded shafts extending axially therefrom and a friction grip disposed on the end of at least one of said threaded shafts; said friction grip includes a plurality of deformable partitioned tabs;
- extending said cable through said opening and said passageway;
- bringing the threaded lower portion of the cap into threaded complimentary engagement with at least one threaded shaft having said friction grip disposed thereon so that the friction grip extends into said domed portion of said cap;
- advancing said cap onto the at least one shaft having said friction grip disposed thereon to a locked position, wherein said partitioned tabs are forced inwardly from a resting state applying a gripping force on said cable so as to resist motion of the cable and locking mechanism relative to one another; and
- retreating the cap on said at least one shaft to allow the partitioned tabs to return to a resting state to enable the locking mechanism to move relative to the cable.

13. The method of claim 12, further comprising securing said locking mechanism to said lid by using a threaded nut.

* * * * *